United States Patent
Wood et al.

(10) Patent No.: US 10,220,956 B2
(45) Date of Patent: Mar. 5, 2019

(54) POSITION SENSING

(71) Applicants: Airbus Operations Limited, Bristol (GB); Airbus Operations GmbH, Hamburg (DE)

(72) Inventors: Christopher Wood, Bristol (GB); Alan Sharp, Bristol (GB); Carsten Heuer, Hamburg (DE)

(73) Assignees: AIRBUS OPERATIONS LIMITED, Bristol (GB); AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/254,365

(22) Filed: Sep. 1, 2016

(65) Prior Publication Data

US 2017/0057659 A1 Mar. 2, 2017

(30) Foreign Application Priority Data

Sep. 1, 2015 (GB) .................................. 1515503.9

(51) Int. Cl.
| | | |
|---|---|---|
| B64D 45/00 | (2006.01) | |
| G01D 5/353 | (2006.01) | |
| G01D 5/48 | (2006.01) | |
| G01B 7/00 | (2006.01) | |
| G01B 11/00 | (2006.01) | |

(52) U.S. Cl.
CPC ......... B64D 45/0005 (2013.01); G01B 7/003 (2013.01); G01B 11/002 (2013.01); G01D 5/353 (2013.01); G01D 5/35312 (2013.01); G01D 5/35316 (2013.01); G01D 5/485 (2013.01)

(58) Field of Classification Search
CPC .. B64D 45/0005; G01B 7/003; G01B 11/002; G01B 11/14; G01B 2290/25; G01B 7/023; G01B 7/14; G01D 5/353; G01D 5/35303; G01D 5/35316; G01D 5/485; B60R 16/03; H01H 37/00; H01H 37/54; H01H 61/00
USPC .................................................. 356/614–640
See application file for complete search history.

(56) References Cited

U.S. PATENT DOCUMENTS

| 5,471,139 | A | 11/1995 | Zadoff | |
|---|---|---|---|---|
| 6,809,516 | B1 | 10/2004 | Li et al. | |
| 2007/0014506 | A1* | 1/2007 | Arias Vidal | ........... G01D 5/485 385/13 |
| 2009/0266977 | A1 | 10/2009 | Kosht et al. | |

(Continued)

FOREIGN PATENT DOCUMENTS

| EP | 1 020 734 | 7/2000 |
|---|---|---|
| EP | 2735849 | 5/2014 |

(Continued)

OTHER PUBLICATIONS

Extended European Search Report cited in European patent application No. 16185654.7, dated Jan. 17, 2017 (9 pages).

(Continued)

*Primary Examiner* — Tri T Ton
(74) *Attorney, Agent, or Firm* — Nixon & Vanderhye P.C.

(57) ABSTRACT

An apparatus for determining the position of an object having one or more magnetic elements. The apparatus includes magnetostrictive optical sensors, each arranged to produce a signal which is indicative of a proximity of the sensor to the one or more magnetic elements. The apparatus is arranged to determine the position of the object based on a plurality of such proximity signals.

25 Claims, 3 Drawing Sheets

(56) References Cited

U.S. PATENT DOCUMENTS

| | | | |
|---|---|---|---|
| 2013/0027030 A1 | 1/2013 | Twerdochlib et al. | |
| 2013/0141081 A1* | 6/2013 | Pfaffinger | G01D 5/14 |
| | | | 324/207.12 |
| 2013/0245992 A1* | 9/2013 | Servel | G01D 5/145 |
| | | | 702/150 |
| 2014/0139225 A1 | 5/2014 | Mandviwala | |
| 2014/0185056 A1 | 7/2014 | Dekate et al. | |
| 2014/0207407 A1* | 7/2014 | Liang | G01B 7/003 |
| | | | 702/150 |
| 2015/0203027 A1* | 7/2015 | Armbruster | H03K 17/9517 |
| | | | 324/207.2 |

FOREIGN PATENT DOCUMENTS

| | | |
|---|---|---|
| EP | 2806251 | 11/2014 |
| WO | 2006/123103 | 11/2006 |
| WO | 2015/106732 | 7/2015 |

OTHER PUBLICATIONS

Examination Report issued in European Patent Appln. No. 16185654.7-1022, five pages, dated Sep. 25, 2018.

* cited by examiner

POSITION SENSING

RELATED APPLICATION

This application claims priority to United Kingdom patent application GB1515503.9 filed Sep. 1, 2015, the entirety of which is incorporated by reference.

TECHNICAL FIELD

The present invention relates to an apparatus and method for determining the position of an object.

BACKGROUND

Proximity sensors are used to detect or measure the proximity of a target to the sensor. A known proximity sensor is based on the principle of electric induction, and detects the proximity of a metallic target by monitoring the inductance of a metallic loop of the sensor. However, induction proximity sensors suffer from interference from metallic objects other than the target, and from electromagnetic interference.

Another known proximity sensors is based on the principle of magnetostriction, where the shape or dimension of a magnetostrictive material varies when subjected to varying magnetic field strength. The varying proximity of a magnet to a portion of magnetostrictive material can be determined by measuring a resultant change in shape or dimension of the portion of material. The change in shape or dimension can be interrogated optically, for example via an optical component whose optical characteristics vary in response to a change in shape or dimension.

In some applications, after calibration, a proximity sensor may be used to infer the distance between two objects. For example, a sensor head may be attached to one object, and a target may be attached to a different object. However, a misalignment of either of the sensor head or the target can lead to an erroneous determination of the distance between the objects. For example, if the target is unintentionally shifted in a direction perpendicular to the target-sensor axis, then the sensor will indicate that the distance between the objects is larger than it actually is. Such a shift necessitates recalibration of the sensor-target system and/or access to the target or sensor to realign the sensor and/or target as appropriate. This is time consuming, and in some applications can be problematic due to inaccessibility of the target and/or sensor.

SUMMARY

A first aspect of the present invention provides an apparatus for determining the position of an object having one or more magnetic elements, the apparatus comprising a plurality of magnetostrictive optical sensors, each arranged to produce a signal which is indicative of a proximity of the sensor to the one or more magnetic elements, the apparatus being arranged to determine the position of the object based on a plurality of such proximity signals.

Optionally, the plurality of sensors are arranged in a two-dimensional array or a three dimensional array.

Optionally, the apparatus is arranged to determine a three dimensional position of the object.

Optionally, the apparatus is arranged to determine whether, for each proximity signal, a characteristic of the proximity signal is above a first predefined threshold and/or below a second predefined threshold.

Optionally, each sensor comprises an optical element located within an optical fibre.

Optionally, the optical elements of at least two of the plurality of sensors are located within the same optical fibre.

Optionally, the optical element of at least one of the sensors is a Fibre Bragg Grating (FBG).

Optionally, the optical element of at least one of the sensors is a Fibre Fabry-Perot (FFP) interferometer.

Optionally, each sensor comprises a magnetostrictive coating on the optical fibre.

A second aspect of the present invention provides an aircraft door assembly comprising the apparatus according to the first aspect.

Optionally, the door assembly is one of a pressurised cabin door assembly, an avionic internal access door assembly, an external avionics door assembly, a cargo door assembly, and a landing gear door assembly.

A third aspect of the present invention provides a landing gear assembly comprising the apparatus according to the first aspect.

A fourth aspect of the present invention provides a system comprising the apparatus of the first aspect, and the object having the one or more magnetic elements.

Optionally, the system is arranged so that each sensor is arranged to produce a signal which is indicative of a proximity of the sensor to only one magnetic element of the object.

Optionally, the object has a first magnetic element, and the system is arranged so that each of the plurality of sensors is arranged to produce a signal which is indicative of a proximity of the sensor to the first magnetic element.

Optionally, the apparatus is arranged to determine the position of the object based on a determination, for each sensor, of the proximity of the sensor to the first magnetic element.

Optionally, the object has a plurality of the magnetic elements, and the system is arranged so that each sensor is arranged to produce a signal which is indicative of a proximity of the sensor to a different respective one of the plurality of magnetic elements.

Optionally, the object has one magnetic element, and the plurality of sensors are arranged in an array which occupies an area that is larger than an area occupied by the one magnetic element of the object.

Optionally, the object is a component of a door assembly of an aircraft.

Optionally, the object is a component of a landing gear assembly of an aircraft.

Optionally, the apparatus is arranged to determine one or more of a downlock state of the landing gear, an uplock state of the landing gear, a shock absorber compression parameter of the landing gear, a break wearing parameter of the landing gear, a bogie beam rotation parameter of the landing gear, and a steering orientation parameter of the landing gear.

A fifth aspect of the present invention provides a vehicle comprising the apparatus according to the first aspect, or the assembly according to the second or third aspect, or the system according to the fourth aspect.

Optionally, the vehicle is an aircraft.

A sixth aspect of the present invention provides a method for determining, at an apparatus, the position of an object having one or more magnetic elements, the apparatus comprising a plurality of magnetostrictive optical sensors, each arranged to produce a signal which is indicative of a proximity of the sensor to the one or more magnetic elements, the method comprising producing a plurality of such signals; and determining, based on the plurality of signals, the position of the object.

Optionally, the determining is based on a determination, for each sensor, of the proximity of the sensor to one magnetic element of the object.

Optionally, the determining involves bilateration and/or trilateration using the determined proximity of each sensor to the one magnetic element.

Optionally, the plurality of sensors are arranged in a two-dimensional array or a three-dimensional array, and the determining comprises determining a three-dimensional position of the object.

Optionally, the method comprises: determining whether, for each proximity signal, a characteristic of the proximity signal is above a first predefined threshold and/or below a second predefined threshold.

Optionally, the method comprises: storing the determined position of the object; and monitoring the position of the object relative to the stored position.

A seventh aspect of the present invention provides a unit for attachment to a first object and for use in determining the position of a second object having one or more magnetic elements, the unit comprising a plurality of magnetostrictive optical sensors fixedly located relative to each other, each sensor comprising a magnetostrictive portion and an optical element mechanically coupled to the magnetostrictive portion so that a change in shape of the magnetostrictive portion causes a change in an optical characteristic of the optical element.

BRIEF DESCRIPTION OF THE DRAWINGS

Embodiments of the invention will now be described, by way of example only, with reference to the accompanying drawings, in which.

DETAILED DESCRIPTION

Figure 1:
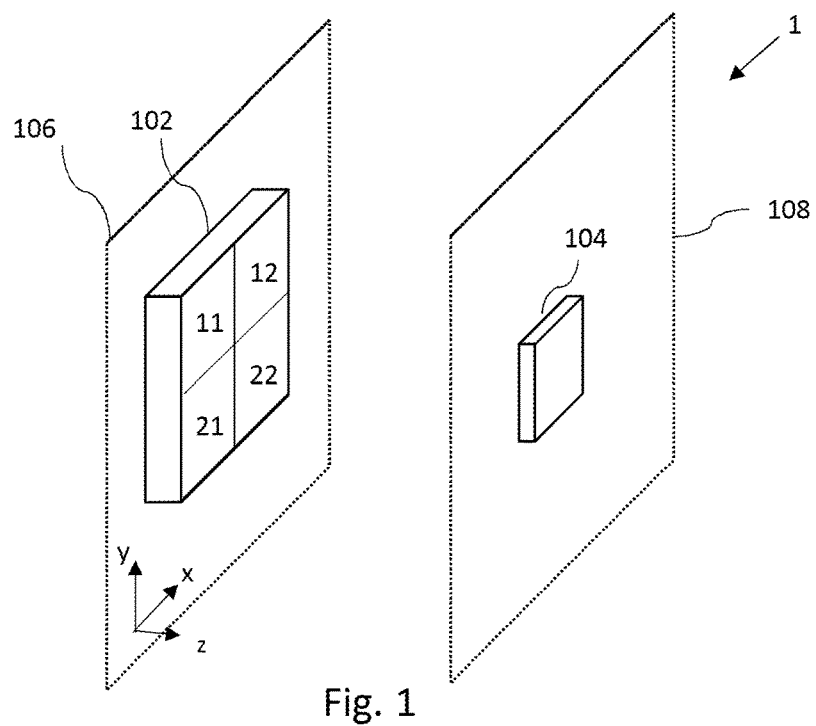
FIG. 1 shows a schematic perspective view of an example of a system of an embodiment of the invention.

Referring to FIG. 1, there is shown a schematic perspective view of an example of a system 1 according to an embodiment of the present invention. The system 1 comprises an apparatus 102 and a first object 108 comprising a magnetic element 104.

The magnetic element 104 may be, for example, fixedly attached to the object 108, or may be integral to the object 108 itself. The magnetic element 104 may be, for example, a permanent magnet or an electromagnet, or may be itself comprised of a plurality of magnetic elements (not shown).

The apparatus 102 comprises a plurality of sensors 11, 12, 21, 22. In this embodiment, the apparatus has first to fourth sensors 11, 12, 21, 22, arranged in a two dimensional two-by-two array, and the first to fourth sensors 11, 12, 21, 22 are numbered according to the column M and row N number within the array at which they are located (i.e. "MN"). For example, as viewed from the perspective of the magnetic element 104, the sensor in the first column and the first row of the array is numbered 11.

Each of the sensors 11, 12, 21, 22 is arranged to produce a signal which is indicative of a proximity of the sensor 11, 12, 21, 22 to the magnetic element 104. In this embodiment, each of the sensors 11, 12, 21, 22 of the apparatus 102 is arranged to produce a signal which is indicative of a proximity of the sensor 11, 12, 21, 22 to only one magnetic element 104 of the object 108. As explained in more detail below, by using for example bilateration and/or trilateration, the apparatus 102 is able to use the proximity signals from a plurality of the sensors 11, 12, 21, 22 to determine a position of the one magnetic element 104, and hence a position of the object 108, relative to the apparatus 102 (for example relative to at least one of the sensors 11, 12, 21, 22). In such a way, the apparatus 102 may determine the position of the object 108 relative to the apparatus 102 (for example relative to at least one of the sensors 11, 12, 21, 22) based on a determination, for each sensor 11, 12, 21, 22 of the apparatus 102, of the proximity of the sensor 11, 12, 21, 22 to the one magnetic element 104.

In this embodiment, the apparatus 102 (for example the sensors 11, 12, 21, 22) is attached to a second object 106, and the apparatus 102 is able to determine a position of the magnetic element 104 relative to the apparatus 102 (for example relative to at least one of the sensors 11, 12, 21, 22). Alternatively, the apparatus 102, or a part thereof, may be integral to the second object 106 itself (for example one or more of the sensors 11, 12, 21, 22 may be integral to the second object 106). The apparatus 102 may be provided with data indicative of the position of the apparatus 102 relative to the second object 106, and data indicative of the position of the magnetic element 104 relative to the object 108, and thus is able to determine a position of the object 108 relative to the second object 106. For example, the first object 108 and the second object 106 may be components of a door assembly, such as a pressurized cabin door assembly of an aircraft. The system 1 may therefore be used, for example, to determine whether or not a cabin door is properly closed with respect to a body of the aircraft.

In this embodiment, the apparatus 102 is arranged to use the proximity signals from at least three of the sensors 11, 12, 21 to determine a three-dimensional position of the first object 108 relative to the apparatus 102 (for example relative to at least one of the sensors 11, 12, 21). In other embodiments, the apparatus 102 may be arranged to use the proximity signal from at least one of the sensors 11, 12, 21 to determine a one-dimensional or a two-dimensional position of the first object 108 relative to the apparatus 102 (for example relative to the at least one of the sensors 11, 12, 21).

In this embodiment, data representative of respective locations of each of the three sensors 11, 12, 21 relative to each other of the three sensors 11, 12, 21 are available to the apparatus 102. For example, the locations of the sensors 11, 12, 21 relative to one another may be fixed, for example by fixedly connecting each sensor 11, 12, 21 to a known location on a common mounting unit (not shown), and the apparatus may have access to stored information as to the relative locations of the sensors 11, 12, 21. Alternatively, the sensors 11, 12, 21 may be moveable, and the apparatus 102 may receive data indicative of the locations of the sensors 11, 12, 21 relative to each other as they move. It will be appreciated that, although in FIG. 1 the sensors 11, 12, 21, 22 are shown in a square two-dimensional array, this need not be the case. Providing that the relative locations of each of the sensors 11, 12, 21, 22 with respect to one another is known to the apparatus 102, the sensors may be arranged in any conceivable arrangement. Thus, in other embodiments, the sensors may be arranged in an array that is other than a two-by-two array.

The proximity signals from the first to third sensors 11, 12, 21 indicate the distances between the magnetic element 104 and each of the first to third sensors 11, 12, 21, respectively. The apparatus 102 may then perform a trilateration calculation using these indicated distances, in conjunction with the information on the locations of the sensors 11, 12, 21 relative to each other, to determine the position of the magnetic element 104 with respect to the apparatus 102.

The position of the magnetic element 104 with respect to the apparatus 102 may be used to determine a distance of the magnetic element 104 from a plane of the first to third sensors 11, 12, 21, i.e. a z coordinate of the magnetic element 104 with respect to the apparatus 102 as shown in FIG. 1. Hence, the distance between the first object 108 and the second object 106 can be determined.

For example, if the first object 108 is a cabin door of an aircraft, and the second object 106 is a cabin door frame of the aircraft, the distance between the cabin door and the door frame can be determined. This distance can be used to determine whether the door is fully closed, for example, by determining whether the distance measured is less than a predetermined value.

The determination of the distance between the first object 108 and the second object 106 is resistant to an offset of the position of the magnetic element 104 in the plane of the first body 108, or an offset of the position of the first body 108 in this plane. Moreover, the determination is resistant to an offset of the apparatus 102 in the plane of the second body 106, or an offset of the second body 106 in this plane (i.e. the x-y plane shown in FIG. 1). As a result, an unintentional shift of any of the magnetic element 104, the first body 108, the apparatus 102, and the second body 106 in a plane parallel to the x-y plane as shown in FIG. 1 will not lead to an erroneous determination of distance between the first body 108 and the second body 106. Furthermore, such a shift does not necessitate a recalibration of the apparatus-element system, or a readjustment of the position of the element 104 relative to the apparatus 102 (for example relative to at least one of the sensors 11, 12, 21).

The determination of the position of the magnetic element 104 relative to the apparatus 102 (for example relative to at least one of the sensors (11, 12, 21) can also be used to monitor an offset of the first body 108 relative to the second body 106 in a plane parallel to the x-y plane shown in FIG. 1. For example, a x and/or y offset of the element 104 from the apparatus 102 can be determined from the trilateration calculations, and monitored to determine any change in the offset over time. In the cabin door example, this could be used, for example, to monitor structural changes in the door assembly over multiple openings and closing, and for example, alert an engineer that the door mechanism may need realigning.

The determination of an offset of the first body 108 relative to the second body 106 in a plane parallel to the x-y plane can also be used in a "teach-in" mode of an installation procedure, for example during installation of a cabin door, or the installation of apparatus 102 onto a cabin door, or after the realignment of a door mechanism, or the like. For example, on first installation of a cabin door or similar, the element 104 may not be perfectly aligned with the apparatus 102, and may be offset in a plane parallel to the x-y plane shown in FIG. 1, and the apparatus 102 will determine that there is an offset accordingly. However, the apparatus 102 may be instructed, for example by an engineer via a programming interface or the like, that the determined offset corresponds to a correct alignment of, say, the door with respect to the door frame, and this determined offset may be stored. In other words, the apparatus 102 is "taught" that a given offset corresponds to a correct alignment of the first object 108 and the second object 106, and hence monitors subsequent offsets relative to this initial determined offset. In such a way, the installation of, for example, the apparatus 102, or a cabin door comprising the apparatus 102, or the like, can be simplified.

It will be appreciated that in the example described above, the apparatus 102 does not determine on which side of the plane defined by sensors 11, 12, 21 the magnetic element 104 is located (i.e. whether the determined z-coordinate is positive or negative). However, this information can be determined during calibration, or stored and made accessible to the apparatus, and can be assumed not to change once the system 1 is installed. In this respect, therefore, the determined position of the magnetic element 104 is a three dimensional position. Alternatively, the apparatus 102 may comprise a three dimensional array of sensors (not shown in FIG. 1). For example, there may be an additional sensor (not shown in FIG. 1) offset in the z direction as shown in FIG. 1 from the sensors 11, 12, 21. The comparison of the proximity signals of the sensors 11, 12, 21 with the proximity signal from the additional sensor (not shown in FIG. 1) provides an indication of which side of the plane defined by sensors 11, 12, 21 the magnetic element 104 is located (i.e. whether the determined z-coordinate is positive or negative), and hence a three dimensional position of the magnetic element 104 may be determined. As another example, there may be a plurality of additional sensors (not shown in FIG. 1), for example, one for each of the first to fourth sensors 11, 12, 21, 22, offset in the z direction as shown in FIG. 1 from the first to fourth sensors 11, 12, 21, 22. It will be appreciated that a trilateration calculation using the proximity signals from three or more of a three dimensional array of sensors may be used in combination with the proximity signal from any fourth sensor not in the plane defined by the three or more sensors in order to define the three dimensional position of the magnetic element 104. It will also be appreciated that any conceivable three dimensional configuration of sensors may be adopted, provided that positions of each sensor relative to each other are available to the apparatus 102.

The fourth sensor 22 of the apparatus 102 shown in FIG. 1 may be used in the trilateration calculations to improve the determination of the position of the magnetic element 104 with respect to the apparatus 102. For example, four trilateration calculations may be conducted the by apparatus 102: one for sensors 11, 12, 22; one for sensors 12, 22, 21; one for sensors 22, 21, 11; and one for sensors 21, 11, 12. The results of these calculation may be averaged to provide a more reliable determination as to the position of the magnetic element 104 relative to the apparatus 102 (for example relative to at least one of the sensors 11, 12, 21, 22). Alternatively, the proximity signals from all four of the sensors 11, 12, 21, 22 may be used in a "multilateration" calculation to determine the position of the magnetic element 104 relative to the apparatus 102 (for example relative to at least one of the sensors 11, 12, 21, 22).

It will be appreciated that in variations to the above embodiment, any number of sensors including and beyond three may be used.

It will also be appreciated that, even with only two of the sensors (e.g. the first and second sensors 11, 12), a position of the magnetic element 104 with respect to the apparatus 102 may be determined. For example, if movement of the magnetic element 104 relative to apparatus 102 is constrained to be only in the z-x plane shown in FIG. 1, then this information can be used in conjunction with a bilateration calculation using the proximity signals from the first and second sensors 11, 12 to determine the position of the magnetic element 104 relative to the apparatus 102 (for example relative to at least one of the sensors 11, 12). Similarly to above, from this determined position, the distance between the first object 108 and the second object 102 can be determined in a way that is resistant to an offset of the sensor along the x axis. Alternatively, similarly to above, an offset of the first object 108 and/or of the second object 102 in the x axis can be monitored over time, for example.

In this embodiment, the area of the magnetic element 104 facing the apparatus 102 is smaller than the area occupied by the array of the first to fourth sensors 11, 12, 21, 22. That is, in this embodiment, the first object 108 has one magnetic element 104, and the sensors 11, 12, 21, 22 are arranged in an array which occupies an area that is larger than an area occupied by the one magnetic element 104 of the first object 108. This allows for a more accurate determination of the position of first object 108 relative to the apparatus 106 (for example relative to at least one of the sensors 11, 12, 21, 22). However, the area of the magnetic element 104 facing the apparatus 102 need not necessarily be smaller than the area occupied by the array of the first to fourth sensors 11, 12, 21, 22, and in other embodiments, this may not be the case.

In another embodiment, the apparatus 102 may be arranged to compare the respective proximity signals from the first to fourth sensors 11, 12, 21, 22 to one or more thresholds to determine an approximate three-dimensional position of the magnetic element 104 with respect to the apparatus 102.

In this embodiment, the apparatus 102 is arranged to compare the respective proximity signals from the first to fourth sensors 11, 12, 21, 22 to two thresholds: a so-called "guaranteed actuation" threshold, and a so-called "guaranteed deactuation" threshold. If the proximity signal of a given one of the first to fourth sensors 11, 12, 21, 22 is below the guaranteed actuation threshold, then it may be determined that the magnetic element 104 is within a certain first associated distance from that given sensor (also referred to herein as "near" status). For example, the first associated distance may be one millimeter. If the proximity signal of a given one of the first to fourth sensors 11, 12, 21, 22 is above the guaranteed deactuation threshold, then it may be determined that the magnetic element 104 is not within a certain second associated distance from that given sensor (also referred to herein as "far" status). For example, the second associated distance may be three millimeters. If the proximity signal of a given one of the first to fourth sensors 11, 12, 21, 22 is above the guaranteed actuation threshold, and below the guaranteed deactuation threshold, then the near/far status may not be guaranteed, and hence the reading may not be used in a position determination.

The apparatus 102 may use the near/far status of each of the sensors 11, 12, 21, 22 to determine an approximate three-dimensional position of the magnetic element 104 relative to the apparatus 102 (for example relative to at least one of the sensors 11, 12, 21, 22). For example, if all four of the sensors 11, 12, 21, 22 are determined to be in near status, then the volume in which the magnetic element 104 must be located can be determined, and an upper bound can be placed on each of the x displacement, y displacement and z displacement of the magnetic element 104 from the apparatus 102. In this case, it can be inferred, for example, that the object 108 is both proximal and not offset with respect to the apparatus 102 (and hence the second object 106). In another example, if the first and third sensors 11 and 21 are determined to be in near status, and the second and fourth sensors 12 and 22 are determined to be in far status, then a different volume in which the magnetic element 104 must be located can be determined. In this case, it can be inferred, for example, that the object 108 is proximal to the apparatus 102 (and hence the second object 106) but that the object 108 is offset in the negative x direction with respect to the apparatus 102. In another example, if the first sensor 11 is determined to be in near status, and the second, third and fourth sensors 12, 21 and 22 are determined to be in far status, a different volume in which the magnetic element 104 must be located can be determined. In this case, it can be inferred, for example, that the object 108 is proximal to the apparatus 102 (and hence the second object 106) but that the object 108 is offset in the negative x direction and the negative y direction with respect to the apparatus 102.

The above example configuration provides a simple and robust determination of the proximity of the magnetic element 104 to the apparatus 102, which is resistant to offsets in the x-y plane, or alternatively that can be used to determine a proximity and an indication of an x-y offset of a magnetic element 104 with respect to the apparatus 102.

Figure 2:
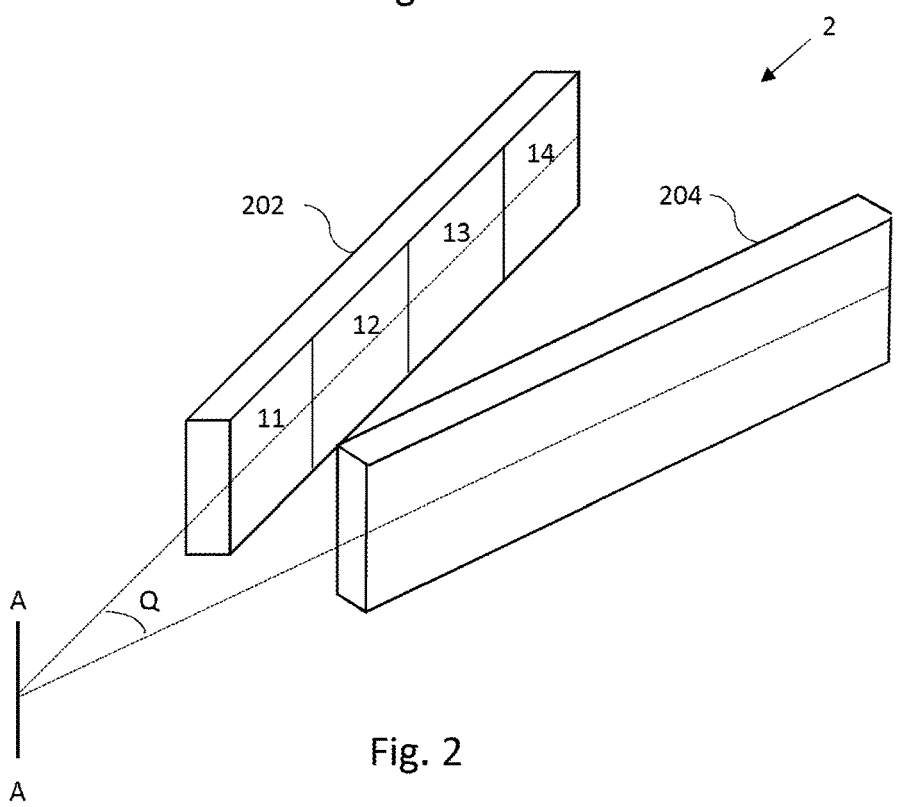
FIG. 2 shows a schematic perspective view of an example of a another system of an embodiment of the invention.

Referring to FIG. 2, there is shown a schematic perspective view of an example of another system 2 according to an embodiment of the present invention.

The system 2 of this embodiment comprises a magnetic element 204 of a first object (not shown for clarity in FIG. 2), and an apparatus 202 attached to a second object (not shown for clarity in FIG. 2). The apparatus 202 comprises a plurality of sensors 11, 12, 13, 14. In this embodiment, the apparatus 202 has first to fourth sensors 11, 12, 13, 14, which are arranged in a one-dimensional one-by-four array. Similarly to above, each of the first to fourth sensors 11, 12, 13, 14 is arranged to produce a signal which is indicative of a proximity of the sensor 11, 12, 13, 14 to magnetic element 204. In this embodiment, the magnetic element 204 is of a length so as to span the length of the array of sensors 11, 12, 13, 14. It will be appreciated that, although the magnetic element 204 is shown in FIG. 2 as a single block, the magnetic element 204 may instead comprise a plurality of magnets or electromagnetic components (not shown) that span the length of the element 204. For example, there may be one magnet for each of the first to fourth sensors 11, 12, 13, 14. That is, the first object (not shown for clarity in FIG. 2) may have a plurality of magnetic elements (not shown), and each sensor 11, 12, 13, 14 of the apparatus 202 may be arranged to produce a signal which is indicative of a proximity of the sensor 11, 12, 13, 14 to a different respective one of the plurality of magnetic elements.

The apparatus 202 and the magnetic element 204 are arranged in this embodiment such that a longitudinal axis of the apparatus 202 and a longitudinal axis of the magnetic element 204 are separated by an angle Q about an axis A-A. The axis A-A is perpendicular to the plane including the longitudinal axis of apparatus 202, and perpendicular to the longitudinal axis of the magnetic element 204. In this embodiment, movement of the magnetic element 204 relative to the apparatus 202 (for example relative to at least one of the sensors 11, 12, 13, 14) is restricted to rotation about the axis A-A. As an example, this arrangement may occur where axis A-A is the hinge of a door, the apparatus 202 is attached to a door frame, and the magnetic element 204 is attached to the door.

It will be appreciated that, if a distance of the apparatus 202 from the axis A-A and a distance of the magnetic element 204 (or magnetic elements) from the axis A-A are known, then the angle Q between the apparatus 202 and the magnetic element 204 may be determined from an analysis of the proximity signals from the first to fourth sensors 11, 12, 13, 14 using trigonometry. Having determined the angle Q, the apparatus 202 may then determine the position of the first object comprising the magnetic element 204 relative to the second object to which the apparatus 202 is attached.

Alternatively, the proximity signals from the first to fourth sensors 11, 12, 13, 14 may be compared to one or more thresholds as described above, to determine the near/far status of each of the first to fourth sensors 11, 12, 13, 14 with respect to the magnetic element 204. In this example, an approximation of the position of the object comprising the magnetic element 204 (or magnetic elements) may be obtained by analysing the near/far status of each of the first to fourth sensors 11, 12, 13, 14. For example, if the first sensor 11 shows a near status, but the second to fourth sensors 12, 13, 14 shows a far status, then the range of angles Q within which the magnetic element 204 must be positioned can be determined. For example, it may be determined from this information that the door to which the magnetic element 204 is attached is only partially closed (but not fully closed) with respect to the door frame. As the angle Q between the apparatus 202 and the magnetic element 204 reduces, the status of each of the second to fourth sensors 12, 13, 14 will change from far to near, and hence the progress of, for example, a door closing can be monitored. Such monitoring of the progress of the change in angle Q is resistant to an offset of the magnetic element 204 in the direction of the longitudinal axis of the magnetic element 204, and an offset of the apparatus 202 in the direction of the longitudinal axis of the apparatus 202, providing the change in near/far status of all of the first to fourth sensors 11, 12, 13, 14 can still be monitored.

It will be appreciated that, although in the above example the monitored progress is that of the constrained rotation of the apparatus 202 with respect to the magnetic element 204 (or magnetic elements) about the axis A-A, this need not necessarily be the case. For example, in other embodiments the constrained movement of the apparatus 202 with respect to the magnetic element 204 (or magnetic elements) may comprise a simultaneous rotation and translation, or a translation and then a rotation, of the apparatus 202 with respect to the magnetic element 204 (or magnetic elements). The constrained movement may comprise linear movement of the magnetic element(s) 204 relative to the sensors 11, 12, 13, 14. For example, a plurality of sensors 11, 12, 13, 14 may be placed along a predefined path (not shown in FIG. 2), and the progress of an object comprising one or more magnetic elements travelling along the predefined path (not shown in FIG. 2) may be monitored with reference to the proximity signals from each sensor 11, 12, 13, 14. The constrained movement may also comprise rotation of the apparatus 202 and/or magnetic element(s) 204 about an axis different from axis A-A, for example, rotation about an axis perpendicular to axis A-A. For example, a plurality of sensors 11, 12, 13, 14 may be placed around the circumference of a disk (not shown in FIG. 2), and the rotation of that disk relative to an object comprising one or more magnetic elements may be monitored with reference to the proximity signals from each sensor 11, 12, 13, 14. It will therefore be appreciated that the plurality of sensors 11, 12, 13, 14 and one or more magnetic elements 204 may be suitably located to monitor the progress of any defined relative constrained movement, to determine a position of an object comprising the magnetic element(s) 204 relative to the apparatus 202 (for example relative to at least one of the sensors 11, 12, 13, 14).

Respective apparatuses 3, 4 for determining the position of an object comprising one or more magnetic elements according to some exemplary embodiments of the present invention will now be described with reference to FIGS. 3 and 4.

Figure 3:
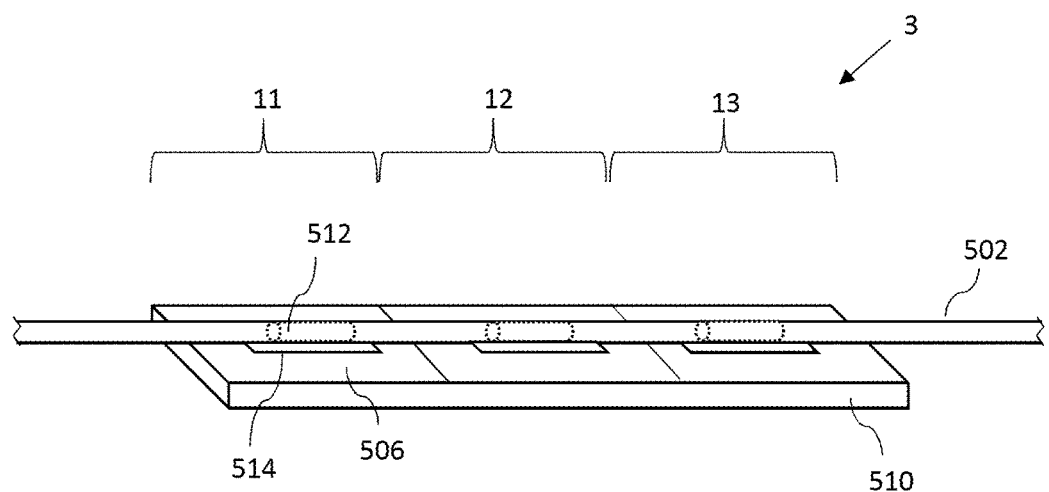
FIG. 3 shows a schematic perspective view of an example of an apparatus of an embodiment of the invention.

Referring to FIG. 3, an apparatus 3 comprises a plurality of magnetostrictive optical sensors 11, 12, 13. Each of the first to third sensors 11, 12, 13 of the apparatus 2 of this embodiment comprises a magnetostrictive portion 506 and an optical element 512 mechanically coupled 514 to the magnetostrictive portion 506 so that a change in shape of the magnetostrictive portion 506 causes a change in an optical characteristic of the optical element 512. In the present embodiment, the optical elements 512 of all of the first to third sensors 11, 12, 13 are located within the same optical fibre 502. However, in other embodiments, the optical elements 512 may be located in respective different optical fibres. In this embodiment, the optical fibre 502 is bonded or adhered 514 to the magnetostrictive portion 506. The magnetostrictive portion 506 may be common to each of the sensors 11, 12, 13. Alternatively, there may be a different magnetostrictive portion for each of the first to third sensors 11, 12, 13. In the embodiment illustrated in FIG. 3, the magnetostrictive portion 506 for all of the first to third sensors 11, 12, 13 is a plate 510 made of magnetostrictive material.

The magnetostrictive portion 506 comprises one or more magnetostrictive materials, i.e. materials whose shape or dimension varies when subjected to varying magnetic field strength. For example, the magnetostrictive portion 506 may be made from one or more magnetostrictive materials selected from the group consisting of: colbalt, nickel, $Tb_xDy_{1-x}Fe_2$ (x~0.3) (e.g. Terfenol-D), and $Fe_{81}Si_{3.5}B_{13.5}C_2$ (e.g. Metglas®).

The optical element 512 of one or each of the first to third sensors 11, 12, 13 may be, for example, a Fibre Bragg Grating (FBG). A FBG is a distributed Bragg reflector located within an optical fibre and comprising periodic variations in the refractive index of the core of the fibre along a section of the length of the optical fibre. The wavelength of a band of light reflected from the FBG is dependent on the axial strain of the fibre. When an FBG is mechanically coupled (for example bonded to, attached to, or tightly wound around) a magnetostrictive portion of a sensor, a change in shape or dimension of the magnetostrictive portion changes the axial strain in the FBG, which in turn changes the wavelength of a band of light reflectable by the FBG. Therefore, by monitoring light reflected from an FBG bonded to the magnetostrictive portion, the proximity of a magnetic element 104 to the magnetostrictive portion (and hence the sensor 11, 12, 13) can be determined.

Multiple FBGs acting as the optical elements 512 for respective sensors 11, 12, 13 may all be located in one, common optical fibre. For example, the range of wavelengths reflectable by one FBG located in a fibre may be different from the range of wavelength reflectable by a second FBG in the same fibre. A first FBG may therefore be transparent to a range of wavelengths needed to interrogate a second FBG, and the first and second FBGs may be transparent to a range of wavelengths needed to interrogate a third FBG, and so on. As a result, the optical elements 512 of the first to third sensors 11, 12, 13 can be located in a single optical fibre, which reduces the weight and complexity of connections needed to interrogate the sensors 11, 12, 13.

In another example, the optical element 512 of one or each of the first to third sensors 11, 12, 13 may be a Fibre Fabry-Perot interferometer (FFP). An FFP comprises two reflecting surfaces located within an optical fibre and separated by a distance. Light reflecting from a first of the reflective surface interferes with light reflecting from a second of the reflective surfaces. The phase difference between the two reflected beams is a function of the wavelength of the light, and of the distance between the reflective surfaces. Therefore, for a fixed wavelength of interrogation light, a change in the distance between the two reflective surfaces results in an associated change in the power of light reflected from the FFP. Alternatively, when a broadband interrogation light source is used, a change in the distance between the two reflective surfaces results in an associated change in the spectrum of light reflected from the FFP, i.e. an associated change in the wavelength of a band of light most strongly reflected by the FFP. With the FFP mechanically coupled (for example bonded to, attached to, or tightly wound around) a magnetostrictive portion of a sensor, a change in shape or dimension of the magnetostrictive portion changes the distance between the reflective surfaces in the FFP, which in turn changes the wavelength of a band of light reflectable by the FFP. Therefore, by monitoring light reflected from an FFP mechanically coupled to the magnetostrictive portion, the proximity of a magnetic element 104 to the magnetostrictive portion 506 (and hence the sensor 11, 12, 13) can be determined.

It should be noted that, practically speaking, in order to avoid interference between the proximity signals provided by different FFPs 512, the FFPs are located in respective separate optical fibres (not shown in FIG. 3).

Figure 4:
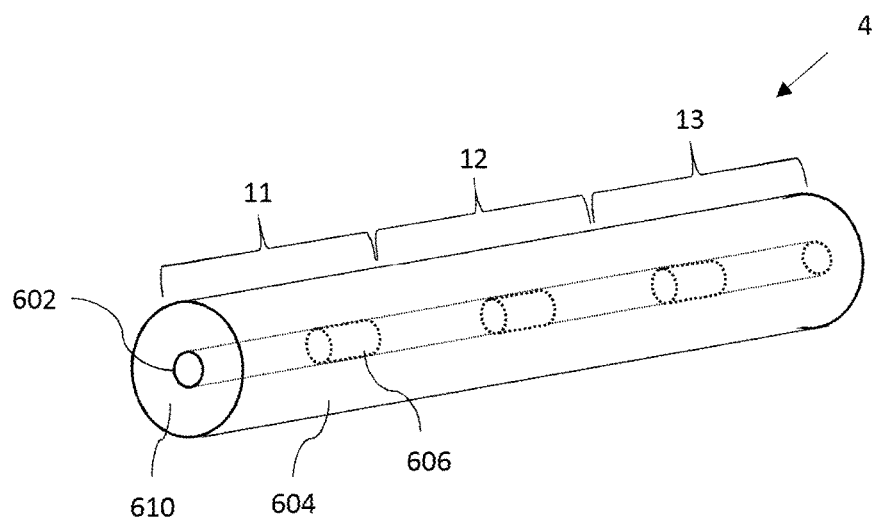
FIG. 4 shows a schematic perspective view of an example of an apparatus of an embodiment of the invention.

Another example configuration of the magnetostrictive optical sensors 11, 12, 13 of the apparatus 3 according to another exemplary embodiment of the present invention is illustrated schematically in FIG. 4.

Referring to FIG. 4, the magnetostrictive portion 604 of each of first to third sensors 11, 12, 13 is provided by a magnetostrictive coating (or cladding) 610 on an optical fibre 602 within which optical fibre 602 the optical elements 606 are located. The magnetostrictive coating 610 negates the need to mechanically couple optical elements 606 to a separate magnetostrictive plate (such as the plate 510 of FIG. 3), and hence reduces the required installation space and weight of the apparatus 3.

Figure 5:
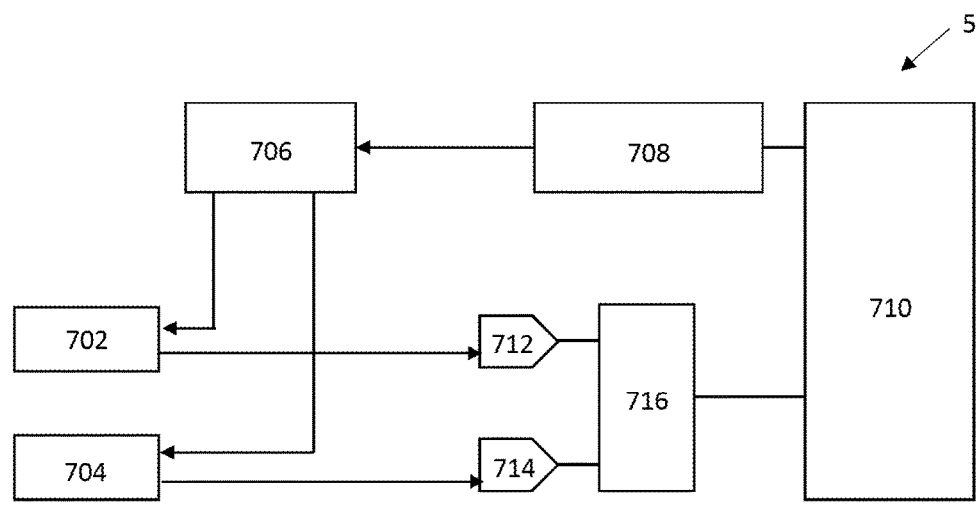
FIG. 5 shows a schematic diagram of an example of a signal processor of an apparatus of an embodiment of the invention.

An exemplary system 5 for processing the proximity signals from the sensors 11, 12, 21, 22 of any of the above-described apparatuses 102, 202, 3, 4 is illustrated schematically in FIG. 5. According to some exemplary embodiments of the present invention, the proximity signal processing system 5 forms part of the position determining apparatus 102, 202, 3, 4.

Referring to FIG. 5, the system 5 comprises first to third optical splitters 702, 704, 706, an optical source 708, a processor 710, two light measurers 712, 714, and an analogue to digital converter 716. The processor 710 is communicatively connected to the light measurers 712, 714. The optical source 708 may be, for example, a tuned laser, or a broadband light source. The optical source 708 is arranged to output light into the third optical splitter 706. The third optical splitter 706 splits the light received from the optical source 708 into two portions, and these two portions are fed into the first and second optical splitters 702, 704, respectively. From the first optical splitter 702, the portion of light received from the third optical splitter 706 is sent through an optical fibre to the optical elements of magnetostrictive optical sensors (e.g. sensors 11 and 21 of FIG. 1) located within that optical fibre (not shown in FIG. 5). From the second optical splitter 704, the portion of light received from the third optical splitter 706 is sent through a different optical fibre to the optical elements of magnetostrictive optical sensors (e.g. sensors 12 and 22 of FIG. 1) located within that optical fibre (not shown in FIG. 5). As described above, the optical elements of the magnetostrictive optical sensors 11, 12, 21, 22 reflect light according to the proximity of a magnetic element 104 (not shown in FIG. 5) to each sensor. The reflected light passes back down the optical fibres through the first and second optical splitters 702, 704 to the first and second light measurers 712 and 714, respectively.

In one embodiment, the optical source 708 may be a broadband light source. In this case, the first and second light measurers 712, 714 may be respective wavelength meters that are arranged to measure the wavelength of the light reflected from the optical elements of the respective magnetostrictive optical sensors 11, 12, 21, 22. The processor 710 processes the wavelength(s) measured by light measurers 712, 714, and converts the measured wavelengths (for example via a calibration) into respective determined distances between the magnetostrictive optical sensors 11, 12, 21, 22 and the magnetic element 104 (not shown in FIG. 5).

In another embodiment, the optical source 708 may be a tuneable narrow band optical source, such as a tuneable laser. In such an embodiment, the first and second light measurers 712, 714 may be photodiodes that are arranged to measure the intensity of light reflected from the optical elements of the respective magnetostrictive optical sensors 11, 12, 21, 22. The analogue to digital converter 716 may be arranged to convert the analogue photodiode signals into digital signals which are then provided to the processor 710. In this example, the processor 710 is arranged to control the tuneable laser 708 to emit light successively at different wavelengths, and at the same time monitor light intensity signals received from the photodiodes 712, 714. The processor 710 can thus determine for which emitted wavelength the highest intensity of reflected light is detected, and thereby determine the wavelength of light most reflected by the optical elements of the magnetostrictive optical sensors 11, 12, 21, 22 at that point in time. The processor 710 may then convert the determined wavelengths (for example via a calibration) into respective determined distances between the magnetostrictive optical sensors 11, 12, 21, 22 and the magnetic element 104 (not shown in FIG. 5).

In one example embodiment, one of the optical splitters 702, 704 may be arranged to direct a portion of the light received from the optical source 708 into a control optical fibre that has an optical element, such as an FBG or an FPP located within it, but is not mechanically coupled to a portion of magetostrictive material (not shown in FIG. 5). The wavelength of the light reflected from the optical element of this control optical fibre will not change as a function of proximity to a magnetic field source, but will change, for example, as a function of temperature. The wavelength of light reflected within this control fibre can therefore be used by processor 710 (for example via calibration) to correct for temperature variations in the vicinity of the apparatus 102 (not shown in FIG. 5).

It will be appreciated that although two optical splitters 702, 704 and two associated light measurers 712, 714 are shown in FIG. 5, in other embodiments there may be any number of optical splitters and associated light measurers. The number of optical splitters and associated light measurers may be based on the number of rows or columns of magnetostrictive optical sensors 11, 12, 21, 22, or the number of magnetostrictive optical sensors 11, 12, 21, 22, or the number of control optical fibres required, for example, to control for different temperature variations in the vicinity of different magnetostrictive optical sensors. It will also be appreciated that, as an alternative to the multiplexing and processing as described above with reference to FIG. 5, any other suitable multiplexing, such as time multiplexing or phase multiplexing, or any other suitable processing of the proximity signals from each of the magnetostrictive optical sensors 11, 12, 21, 22, may be used.

Figure 6:
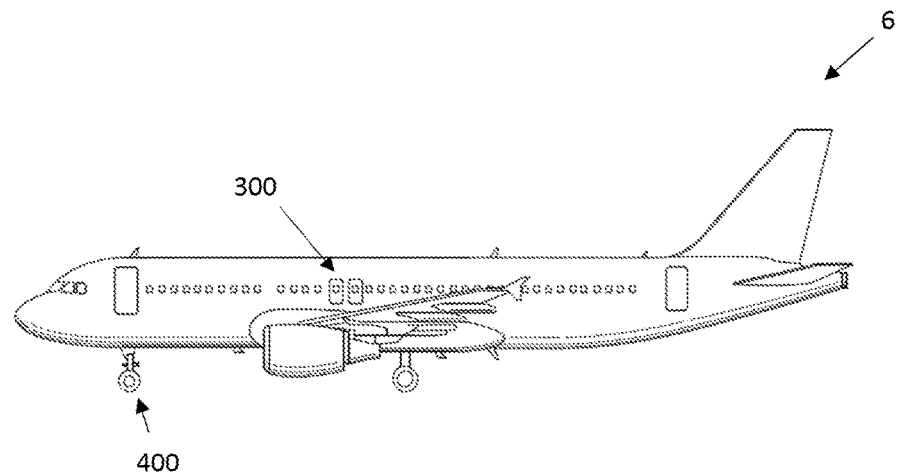
FIG. 6 shows a schematic side view of an example of an aircraft of an embodiment of the invention.

Referring to FIG. 6, there is shown a schematic side view of an example of an aircraft according to an embodiment of the invention. The aircraft 6 comprises an aircraft door assembly 300, which assembly 300 may comprise any one of the above-described apparatuses. The aircraft 6 may comprise any one of the above-described systems. Systems and apparatuses embodying the present invention could be comprised in the aircraft 6 in mechanisms other than the door assembly 300. Such mechanisms include, for example, pressurised cabin door assemblies, avionic internal access door assemblies, external avionics door assemblies, cargo door assemblies, and landing gear door assemblies. The aircraft 6 comprises a landing gear assembly 400, which assembly 400 may comprise any one of the above-described apparatuses and systems. The above described systems and apparatuses may be used in landing gear assembly 400 to determine one or more landing gear parameters. Landing gear parameters may include one of a downlock state or an uplock state of a landing gear (i.e. indicating whether the landing gear is locked in a "down" or "up" position), a shock absorber compression parameter (i.e. indicating the degree to which a shock absorber is compressed) or a break wearing parameter of a landing gear (i.e. indicating a degree to which a brake of a wheel of a landing gear is worn), a bogie beam rotation parameter or a steering orientation parameter of a landing gear (i.e. indicating the degree to which the wheel of the landing gear is rotated with respect to the axis of the aircraft), or any other conceivable landing gear parameters dependent on the proximity or a position of an object relative to another object. The above described systems and apparatus may be used in any conceivable part of an aircraft in which objects or parts of the aircraft move relative to one another. These may include, for example, parts of an aircraft wing such as flaps and ailerons, or for example, parts of a cockpit of an aircraft such as aircraft controls or the like. Moreover, systems and apparatuses embodying the present invention could be comprised in vehicles other than aircraft, such as road vehicles or rail vehicles.

Any one of the above described arrays of sensors may be embodied in a unit, module or component that is for attachment to a first object, and that is for use in determining the position, relative to the first object, of a second object having one or more magnetic elements. In some embodiments, the unit, module or component would then comprise a plurality of magnetostrictive optical sensors fixedly located relative to each other, each sensor comprising a magnetostrictive portion and an optical element mechanically coupled to the magnetostrictive portion so that a change in shape of the magnetostrictive portion causes a change in an optical characteristic of the optical element.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus for determining the position of an object having one or more magnetic elements, the apparatus comprising:
a plurality of magnetostrictive optical sensors arranged in a two-dimensional or three-dimensional array, each arranged to produce a signal which is indicative of a proximity of the sensor to the one or more magnetic elements,
wherein the two-dimensional array or three-dimensional array comprises at least one row of two or more magnetostrictive optical sensors and at least one column of two or more magnetostrictive optical sensors, and
wherein the apparatus is arranged to determine a position of the object based on a plurality of such proximity signals.

2. The apparatus of claim 1, wherein the apparatus is arranged to determine a three dimensional position of the object.

3. The apparatus of claim 1, wherein the apparatus is arranged to determine whether, for each proximity signal, a characteristic of the proximity signal is above a first predefined threshold or below a second predefined threshold.

4. The apparatus of claim 1, wherein each sensor comprises an optical element located within an optical fibre.

5. The apparatus of claim 4, wherein the optical elements of at least two of the plurality of sensors are located within the same optical fibre; or wherein the optical element of at least one of the sensors is a Fibre Bragg Grating (FBG); or wherein the optical element of at least one of the sensors is a Fibre Fabry-Perot (FFP) interferometer; or wherein each sensor comprises a magnetostrictive coating on the optical fibre.

6. A system comprising:
an apparatus configured to determine a position of an object having one or more magnetic elements, the apparatus comprising a plurality of magnetostrictive optical sensors arranged in a two-dimensional or three-dimensional array, each arranged to produce a signal which is indicative of a proximity of the sensor to the one or more magnetic elements,
wherein the two-dimensional array or three-dimensional array comprises at least one row of two or more magnetostrictive optical sensors and at least one column of two or more magnetostrictive optical sensors,
wherein the apparatus being arranged to determine the position of the object based on a plurality of such proximity signals; and
the object having the one or more magnetic elements.

7. The system of claim 6, wherein the system is arranged so that each sensor is arranged to produce a signal which is indicative of a proximity of the sensor to only one magnetic element of the object.

8. The system of claim 7, wherein the object has a first magnetic element, and wherein the system is arranged so that each of the plurality of sensors is arranged to produce a signal which is indicative of a proximity of the sensor to the first magnetic element.

9. The system of claim 8, wherein the apparatus is arranged to determine the position of the object based on a determination, for each sensor, of the proximity of the sensor to the first magnetic element.

10. The system of claim 7, wherein the object has a plurality of the magnetic elements, and wherein the system is arranged so that each sensor is arranged to produce a signal which is indicative of a proximity of the sensor to a different respective one of the plurality of magnetic elements.

11. The system of claim 6, wherein the object has one magnetic element, and wherein the plurality of sensors are arranged in an array which occupies an area that is larger than an area occupied by the one magnetic element of the object.

12. The system of claim 6, wherein the object is a component of a door assembly of an aircraft.

13. The system of claim 6, wherein the object is a component of a landing gear assembly of an aircraft.

14. The system of claim 6 wherein the apparatus is arranged to determine one or more of a downlock state of the landing gear, an uplock state of the landing gear, a shock absorber compression parameter of the landing gear, a break wearing parameter of the landing gear, a bogie beam rotation parameter of the landing gear, and a steering orientation parameter of the landing gear.

15. A method for determining, at an apparatus, a position of an object having one or more magnetic elements, the apparatus comprising a plurality of magnetostrictive optical sensors arranged in a two-dimensional or three-dimensional array, each arranged to produce a signal which is indicative of a proximity of the sensor to the one or more magnetic elements, wherein the two-dimensional array or three-dimensional array comprises at least one row of two or more magnetostrictive optical sensors and at least one column of two or more magnetostrictive optical sensors, the method comprising:
producing a plurality of the signals; and
determining, based on the plurality of signals, the position of the object.

16. The method of claim 15, wherein the determining is based on a determination, for each sensor, of the proximity of the sensor to one magnetic element of the object.

17. The method of claim 16, wherein the determining involves bilateration or trilateration using the determined proximity of each sensor to the one magnetic element.

18. The method of claim 15, wherein the plurality of sensors are arranged in a two-dimensional array or a three-dimensional array, and the determining comprises determining a three-dimensional position of the object.

19. The method of claim 15, the method comprising determining whether, for each proximity signal, a characteristic of the proximity signal is above a first predefined threshold or below a second predefined threshold.

20. A method to determine a position of an object comprising:
producing proximity signals each indicating a proximity of one of a plurality of magnetostrictive optical sensors arranged in a two-dimensional or three-dimensional array to an object having at least one magnetic element, wherein the two-dimensional array or three-dimensional array comprises at least one row of two or more magnetostrictive optical sensors and at least one column of two or more magnetostrictive optical sensors; and
using the proximity signals to determine a position of the object relative to one or more of the magnetostrictive optical sensors.

21. The method of claim 20, wherein the determining includes determining, for each of the sensors, a proximity of the object to the sensor and applying bilateration or trilateration to the determined proximity of the object with respect to each sensor.

22. The method of claim 20, wherein the plurality of magnetostrictive optical sensors are arranged in a multi-dimensional array, and the determining comprises determining a three-dimensional position of the object.

23. The method of claim 20, wherein the determining includes determining, for each proximity signal, whether a characteristic of the proximity signal is above a first threshold or below a second threshold.

24. The method of claim 20 further comprising:
repeating the steps of producing the proximity signals and determining the position of the object during a time period;
after each set of steps of producing the proximity signals and determining the position of the object, storing the position of the object; and
comparing the stored position to the position of the object determined is a subsequent repetition of the steps of producing the proximity signals and determining the position of the object.

25. The method of claim 15 further comprising:
storing the position of the object; and
monitoring the position of the object relative to the stored position.

* * * * *